United States Patent [19]

Pawelzik et al.

[11] Patent Number: 4,995,419
[45] Date of Patent: Feb. 26, 1991

[54] MIXING VALVE FOR SINGLE-LEVER FAUCET

[75] Inventors: Manfred Pawelzik, Soest; Horst Titze, Hagen, both of Fed. Rep. of Germany

[73] Assignee: Friedrich Grohe Armaturenfabrik GmbH & Co., Hemer, Fed. Rep. of Germany

[21] Appl. No.: 467,985

[22] Filed: Jan. 22, 1990

[30] Foreign Application Priority Data

Feb. 10, 1989 [DE] Fed. Rep. of Germany ....... 3903998

[51] Int. Cl.$^5$ ............................................. F16K 11/02
[52] U.S. Cl. .............................. 137/316; 137/625.17; 137/625.4; 251/900
[58] Field of Search ............... 137/316, 625.17, 625.4; 251/900

[56] References Cited

U.S. PATENT DOCUMENTS

| | | | |
|---|---|---|---|
| 3,938,553 | 2/1976 | Ortega | 251/900 X |
| 4,540,023 | 9/1985 | Pawelzik | 137/625.17 |
| 4,621,659 | 11/1986 | Pawelzik | 137/625.17 |
| 4,856,556 | 8/1989 | Mannigmann | 137/625.17 X |

FOREIGN PATENT DOCUMENTS 3244121 5/1984 Fed. Rep. of Germany.

*Primary Examiner*—Gerald A. Michalsky
*Attorney, Agent, or Firm*—Herbert Dubno; Andrew Wilford

[57] ABSTRACT

A single-control mixing valve comprises a housing generally centered on an axis and having an open end, a base plate closing the open end, formed with inlet and outlet passages, and formed around the passages with grooves, respective seals seated in the grooves, a control plate formed with a crossflow cavity and displaceable in the housing to interconnect the passages of the base plate, and a lever pivoted on the control plate for displacing same. The base plate is secured in the housing for only limited axial movement therein by inwardly deflectable barbs and formations pinch the seals in the grooves so that the valve is a self-contained units whose parts cannot become accidentally separated before it is installed.

4 Claims, 2 Drawing Sheets

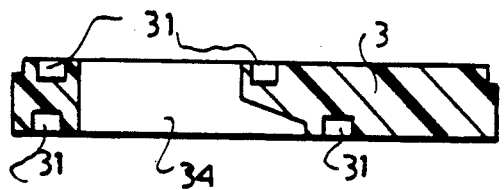
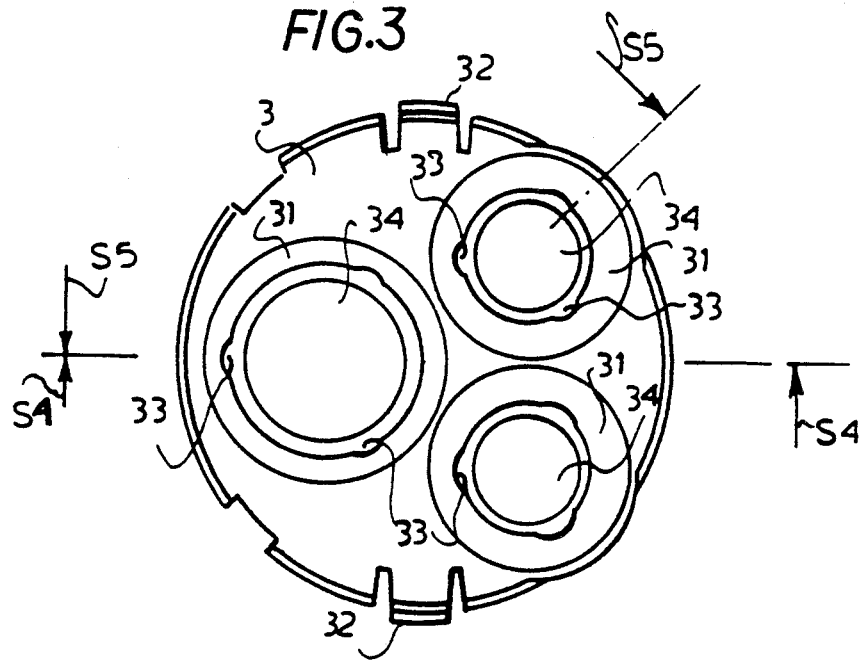
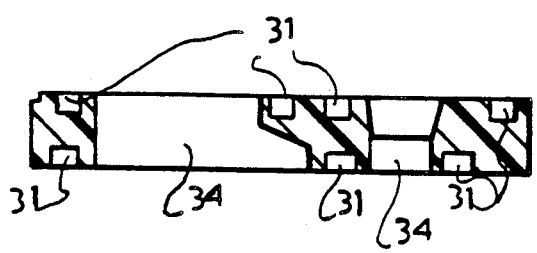

MIXING VALVE FOR SINGLE-LEVER FAUCET

FIELD OF THE INVENTION

The present invention relates to a single-lever faucet. More particularly this invention concerns a mixing-valve assembly for such a faucet.

BACKGROUND OF THE INVENTION

A standard mixing valve (see U.S. Pat. Nos. 4,621,659 and 4,540,023) used in a single-lever faucet has a normally cylindrical housing centered on an axis and a valve plate closing the bottom of the housing and formed with a hot-water inlet port, a cold-water inlet port, and an outlet port. A control plate sits flat atop this valve plate and is formed with a cavity that normally overlies the outlet port and that can also be brought into registration over the inlet ports, either singly or jointly. A lever pivoted on the housing is connected to this control plate to slide it atop the valve plate, thereby determining the amount of overlap of the control-plate cavity with the inlets to determine the amounts of hot and cold water to be shunted through this cavity to the outlet port.

A problem with such a mixing valve, which is typically provided as a separate cartridge that is suitable for use as a replacement part when the original valve wears out, is that it can fall apart prior to mounting unless handled very carefully. The bottom plate, which can be separate from or the same as the valve plate, can fall out, and the seals around the ports on the bottom of this plate also can fall out. Furthermore, the assembly must be made to very close tolerances so that the control and valve plates stay in contact with each other.

OBJECTS OF THE INVENTION

It is therefore an object of the present invention to provide an improved mixing valve for a single-lever faucet.

Another object is the provision of such an improved mixing valve for a single-lever faucet which overcomes the above-given disadvantages, that is which does not fall apart prior to use, even when handled roughly.

SUMMARY OF THE INVENTION

The instant invention is an improvement on a single-control mixing valve comprising a housing generally centered on an axis and having an open end, a base plate closing the open end, formed with inlet and outlet passages, and formed around the passages with grooves, respective seals seated in the grooves, a control plate formed with a crossflow cavity and displaceable in the housing to interconnect the passages of the base plate, and a lever pivoted on the control plate for displacing same. According to this invention the base plate is secured in the housing for limited axial movement therein and formations pinch the seals in the grooves.

Thus the valve according to this invention is a wholly self-contained item that holds together. Thus it can be easily mounted in a faucet or the like without the installer having to manipulate it with care to avoid losing its parts. The limited axial movability of the base plate in the housing compensates for inaccurate manufacturing tolerances.

According to this invention the base plates is formed with a plurality of outwardly directed barbs formed on an edge of the base plate and the housing is formed with inwardly open axially elongated recesses receiving the barbs. Such construction allows these parts to be snapped together.

The formations include at least one transverse rib projecting into each groove and reducing the width thereof by about 10%. Such ribs are formed on cylindrical side walls of the grooves.

DESCRIPTION OF THE DRAWING

The above and other objects, features, and advantages will become more readily apparent from the following, reference being made to the accompanying drawing in which:

FIG. 3 is a bottom view of the valve plate of FIG. 1; and

FIG. 4 and 5 are sections taken respectively along lines S4—S4 and S5—S5 of FIG.3.

SPECIFIC DESCRIPTION

Figure 1:
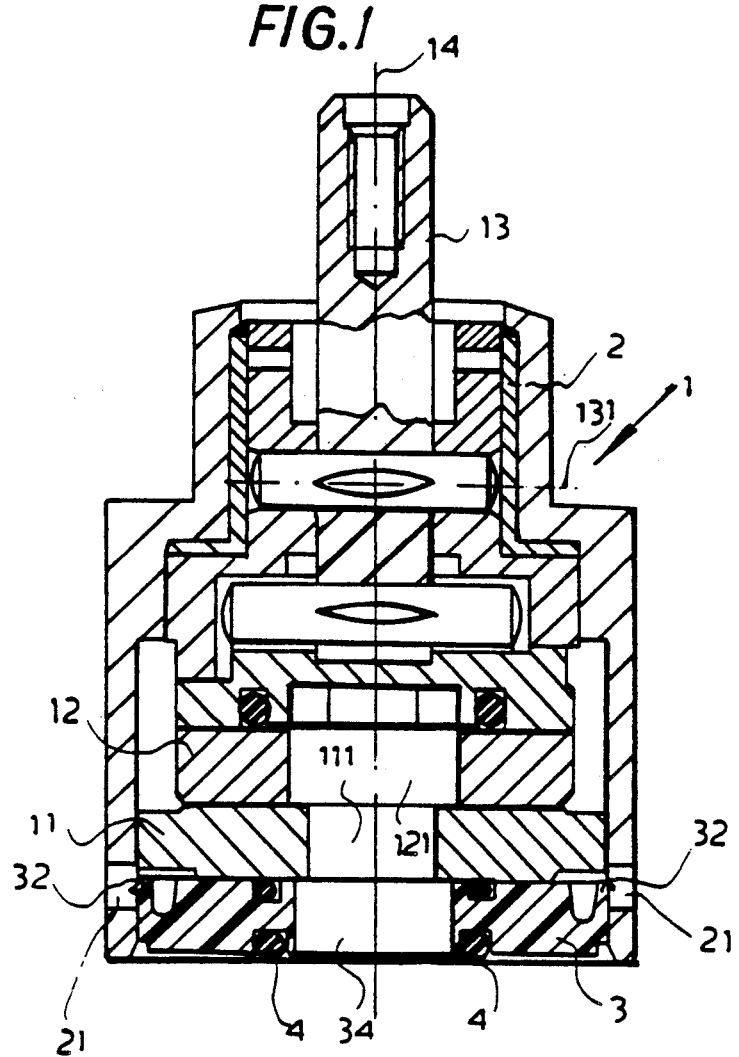
FIG. 1 is an axial section through the mixing valve according to this invention.
Figure 2:
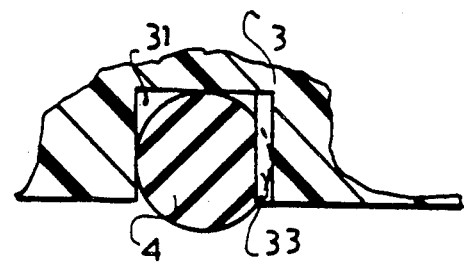
FIG. 2 is a large-scale view of a detail of FIG. 1.

As seen in FIG. 1, a mixing valve 1 according to this invention has a housing 2, 3 formed by a stepped sleeve 2 and a circular base plate or disk 3 both centered on an axis 14. The base plate 3 is formed with inlet and outlet passages 34 that are connected as is known per se to conduits.

Sitting atop the disk 3 is a normally stationary ceramic valve disk 11 formed with passages 111 aligned with the passages 34 of the plate 3. Atop this disk 11 is a two-part ceramic control plate 12 formed with a cross-flow cavity 121 that can allow fluid flow from either or both of the respective inlets to the outlet, as is also well known per se. A lever 13 pivoted at 131 in the housing sleeve 2 and on the disk 12 can move this disk 12 back and forth to vary the volume of flow from the inlet passages to the outlet passage and from side to side to vary the temperature of the outputted water.

In accordance with this invention the lower planar face of the plate 3 is formed around each of the passages 34 with a circular groove 31 having parallel cylindrical sides, and a circular-section O-ring 4 is provided in each of these grooves 31. Furthermore angularly equispaced around the inner surface of each of these grooves 31 are three axially extending and radially outwardly projecting ribs 33 that pinch and compress the respective seals 4, holding them solidly in place. According to this invention the grooves 31 have a transverse width of 2.0 mm and the ribs 33 are part-cylindrical shape with a radius of curvature of 1.5 mm so that the seals 4 are relatively tight in these grooves 31. In addition the ribs 33 project inward some 10% of the groove width, here 0.2 mm, to further ensure that the seals 4 are well retained.

Further according to the invention the plate 3 is formed at least two diametrally opposite locations with outwardly projecting barbs 32 that are received in inwardly open holes 21 formed in the housing 2. The holes 21 are axially much longer than the barbs 32 so that the plate 3 can move limitedly axially in the housing 2 without falling out of it.

We claim:

1. In a single-control mixing valve comprising:
   a housing generally centered on an axis and having an open end;

a base plate closing the open end, formed with inlet and outlet passages, and formed around the passages with grooves;

respective seals seated in the grooves;

a control plate formed with a crossflow cavity and displaceable in the housing to interconnect the passages of the base plate; and a lever pivoted on the control plate for displacing same, the improvement comprising means including a plurality of outwardly directed barbs formed on an edge of the base plate and inwardly open axially elongated recesses receiving the barbs and formed on the housing for securing the base plate in the housing for only limited axial movement therein, and formations pinching the seals in the grooves.

2. The improved single-control mixing valve defined in claim 1 wherein the formation include at least one transverse rib projecting into each groove and reducing the width thereof by about 10%.

3. The improved single-control mixing valve defined in claim 2 wherein the grooves each have a cylindrical side wall from which the respective rib projects.

4. A single-control mixing valve comprising:

a housing generally centered on an axis and having an open end;

a base plate
 closing the open end,
 formed with inlet and outlet passages,
 formed around the passage with grooves of generally regular width,
 formed in each of the grooves with at least one restriction, and
 having an edge formed with a plurality of inwardly deflectable and outwardly projecting barbs of predetermined axial length, the housing being formed with respective inwardly open recesses receiving the barbs and of substantially longer axial length than the barbs, whereby the base plate can move axially in the housing with the barbs in the recesses;

respective seals seated in the grooves and pinched at the restriction thereof;

a control plate
 formed with a crossflow cavity and
 displaceable in the housing to interconnect the passage of the base plate; and a lever pivoted on the control plate for displacing same.

* * * * *